US012614085B2

(12) United States Patent
Lei et al.

(10) Patent No.: US 12,614,085 B2
(45) Date of Patent: Apr. 28, 2026

(54) EXTENSIBLE SOFTWARE TOOL WITH CUSTOMIZABLE MACHINE PREDICTION

(71) Applicant: Oracle International Corporation, Redwood Shores, CA (US)

(72) Inventors: Ming Lei, Ellicott City, MD (US); Catalin Popescu, Atlanta, GA (US); Wendy Lewenberg Etkind, Belmont, MA (US)

(73) Assignee: Oracle International Corporation, Redwood Shores, CA (US)

( * ) Notice: Subject to any disclaimer, the term of this patent is extended or adjusted under 35 U.S.C. 154(b) by 789 days.

(21) Appl. No.: 16/201,290

(22) Filed: Nov. 27, 2018

(65) Prior Publication Data

US 2020/0167669 A1 May 28, 2020

(51) Int. Cl.
*G06N 5/04* (2023.01)
*G06N 3/08* (2023.01)
(Continued)

(52) U.S. Cl.
CPC ................. *G06N 5/04* (2013.01); *G06N 3/08* (2013.01); *G06N 20/10* (2019.01); *G06Q 10/06315* (2013.01); *G06Q 10/083* (2013.01)

(58) Field of Classification Search
CPC ............ G06N 5/04; G06N 3/08; G06N 20/10; G06Q 10/083; G06Q 10/06315
(Continued)

(56) References Cited

U.S. PATENT DOCUMENTS 8,364,613 B1 1/2013 Lin et al.
9,364,071 B2 * 6/2016 Jung ..................... G01J 3/0254
(Continued)

FOREIGN PATENT DOCUMENTS

JP 2000305606 A 11/2000
WO WO-0159655 A2 * 8/2001 ........... G06Q 10/109
(Continued)

OTHER PUBLICATIONS

Carboneue et al, "Application of machine learning techniques for supply chain demand forecasting", Feb. 2008 (Year: 2008).*
(Continued)

*Primary Examiner* — Abdullah Al Kawsar
*Assistant Examiner* — Jun Kwon
(74) *Attorney, Agent, or Firm* — Potomac Law Group, PLLC

(57) ABSTRACT

Systems and methods are provided for performing customizable machine prediction using an extensible software tool. A specification including features of a trained machine learning model can be received and an interface for the trained machine learning model can be generated. The trained machine learning model can be loaded using the interface, the loaded machine learning model including a binary file configured to receive data as input and generate prediction data as output. Predictions can be generated using observed data that is stored according to a multidimensional data model, wherein a portion of the observed data is input to the loaded machine learning model to generate first data predictions, and a portion of the observed data is used by a generic forecast model to generate second data predictions. The first and second data predictions can be displayed in a user interface configured to display intersections of the multidimensional data model.

19 Claims, 9 Drawing Sheets

(51) Int. Cl.
    *G06N 20/10*       (2019.01)
    *G06Q 10/0631*    (2023.01)
    *G06Q 10/083*     (2024.01)

(58) Field of Classification Search
    USPC .......................................................... 706/12
    See application file for complete search history.

(56) References Cited

U.S. PATENT DOCUMENTS

| | | | |
|---|---|---|---|
| 2001/0013009 A1* | 8/2001 | Greening ......... | G06Q 10/06311 |
| | | | 705/7.14 |
| 2006/0015805 A1 | 1/2006 | Humenansky et al. | |
| 2009/0094094 A1* | 4/2009 | Rai ........................ | G06Q 10/04 |
| | | | 705/7.25 |
| 2012/0143883 A1* | 6/2012 | Chen ..................... | G06F 16/958 |
| | | | 707/751 |
| 2013/0024167 A1* | 1/2013 | Blair ....................... | G06F 17/18 |
| | | | 703/2 |
| 2013/0117208 A1* | 5/2013 | Dousse .................. | G06N 20/00 |
| | | | 706/21 |
| 2014/0279753 A1* | 9/2014 | Dalessandro .......... | G06N 20/20 |
| | | | 706/12 |
| 2015/0310344 A1* | 10/2015 | Gunjan .................. | G06Q 50/01 |
| | | | 706/52 |
| 2016/0148115 A1* | 5/2016 | Sirosh .................. | G06K 9/6227 |
| | | | 382/128 |
| 2017/0372226 A1* | 12/2017 | Costa ..................... | G06N 20/20 |
| 2018/0089196 A1* | 3/2018 | Kenthapadi ......... | G06F 21/6245 |
| 2018/0089574 A1* | 3/2018 | Goto ........................ | G06N 5/04 |
| 2018/0131645 A1* | 5/2018 | Magliozzi ............... | G06F 40/30 |
| 2018/0225391 A1* | 8/2018 | Sali .......................... | G06F 7/588 |
| 2018/0341898 A1* | 11/2018 | Bose ....................... | G06N 5/003 |
| 2019/0019213 A1* | 1/2019 | Silberman .......... | G06Q 30/0243 |
| 2020/0160229 A1* | 5/2020 | Atcheson ............... | G06N 20/00 |

FOREIGN PATENT DOCUMENTS

| | | | |
|---|---|---|---|
| WO | 2017168458 A1 | 10/2017 | |
| WO | 2018017259 A1 | 1/2018 | |

OTHER PUBLICATIONS

Pedersen, 2001, "Multidimensional Database Technology" (Year: 2001).*
Paliwal & Kumar, 2009, "Neural networks and statistical techniques: A review of applications" (Year: 2009).*
Weng et al, 2017, "Can machine-learning improve cardiovascular risk prediction using routine clinical data?" (Year: 2017).*
Ainscough et al, 1999, "An empirical investigation and comparison of neural networks and regression for scanner data analysis" (Year: 1999).*
Ma et al, 2014, "Demand forecasting with high dimensional data: The case of SKU retail sales forecasting with intra- and inter-category promotional information" (Year: 2014).*
Sajjadi et al, 2016, "Regularization With Stochastic Transformations and Perturbations for Deep Semi-Supervised Learning" (Year: 2016).*
Islek, 2017, "A Decision Support System for Demand Forecasting based on Classifier Ensemble" (Year: 2017).*
Revuelta, Mar. 2018, "Design and implementation of a software system for the composition of a database and automated trading system on different cryptocurrency trading markets" (Year: 2018).*
Caro & Garcia, 2008, "Developing a multidimensional and hierarchical service quality model for the travel agency industry" (Year: 2008).*
Lee et al, "Information Distortion in a Supply Chain: The Bullwhip Effect", 1997 (Year: 1997).*
Aburto & Weber, "Improved supply chain management based on hybrid demand forecasts", 2007 (Year: 2007).*
Guazzelli et al: "Efficient deployment of predictive analytics through open standards and cloud computing", ACM SIGKDD Explorations Newsletter, Association for Computing Machinery, Inc, us, vol. 11, No. 1, Nov. 16, 2009 (Nov. 16, 2009).
Judith Meskill, "Oracle® Retail Predictive Application Server Classic Client", User Guide Release 16.0 E81301-01, Nov. 2016, 239 pages.
Melissa Artley, "Oracle® Retail Demand Forecasting", Configuration Guide, Release 15.0 E71615-02, Feb. 2016, 130 pages.
Retek® Predictive Application Server™ 11.1, Standards for Developing RPAS Extensions, 2004, 77 pages.

* cited by examiner

302

500

502

| Calendar | Location | Product | 2/2020 | 2/8/2020 | 2/15/2020 | 2/22/2020 | 2/29/2020 | 3/2020 | 3/7/2020 | 3/14/2020 | 3/21/2020 | 3/28/2020 |
|---|---|---|---|---|---|---|---|---|---|---|---|---|
| Measure | 30000 Loafers | | | | | | | | | | | |
| Wp Sales R | | | 292408 | 39925 | 95248 | 122129 | 35105 | 193254 | 53746 | 28484 | 32093 | 51614 |
| Cp Sales R | | | 280359 | 38762 | 92747 | 116314 | 32808 | 182600 | 50703 | 26872 | 30562 | 49629 |
| Wp Sls. RvarCp % | | | 4.3% | 3.0% | 3.0% | 5.0% | 7.0% | 5.8% | 6.0% | 6.0% | 5.0% | 4.0% |
| | | | | | | | | | | | | |
| Wp Net Sales R | | | 172735 | 24062 | 55815 | 71392 | 21464 | 117461 | 31968 | 17758 | 19620 | 30860 |
| Cp Net Sales R | | | 165604 | 23361 | 54189 | 67992 | 20060 | 110954 | 30159 | 16753 | 18683 | 29673 |
| Wp N.Sls. RvarCp % | | | 4.3% | 3.0% | 3.0% | 5.0% | 7.0% | 5.9% | 6.0% | 6.0% | 5.0% | 4.0% |
| | | | | | | | | | | | | |
| Wp Markdown R | | | 21295 | 3039 | 6830 | 8700 | 2725 | 14631 | 4095 | 2285 | 2375 | 3785 |
| Wp Markdown R % | | | 12.3% | 12.6% | 12.2% | 12.2% | 12.3% | 12.5% | 12.8% | 12.9% | 12.1% | 12.3% |
| Cp Markdown R | | | 20415 | 2950 | 6631 | 6631 | 2547 | 13821 | 3864 | 2156 | 2262 | 3640 |
| Cp Markdown R % | | | 12.3% | 12.6% | 12.2% | 12.2% | 12.7% | 12.5% | 12.8% | 12.9% | 12.1% | 12.3% |

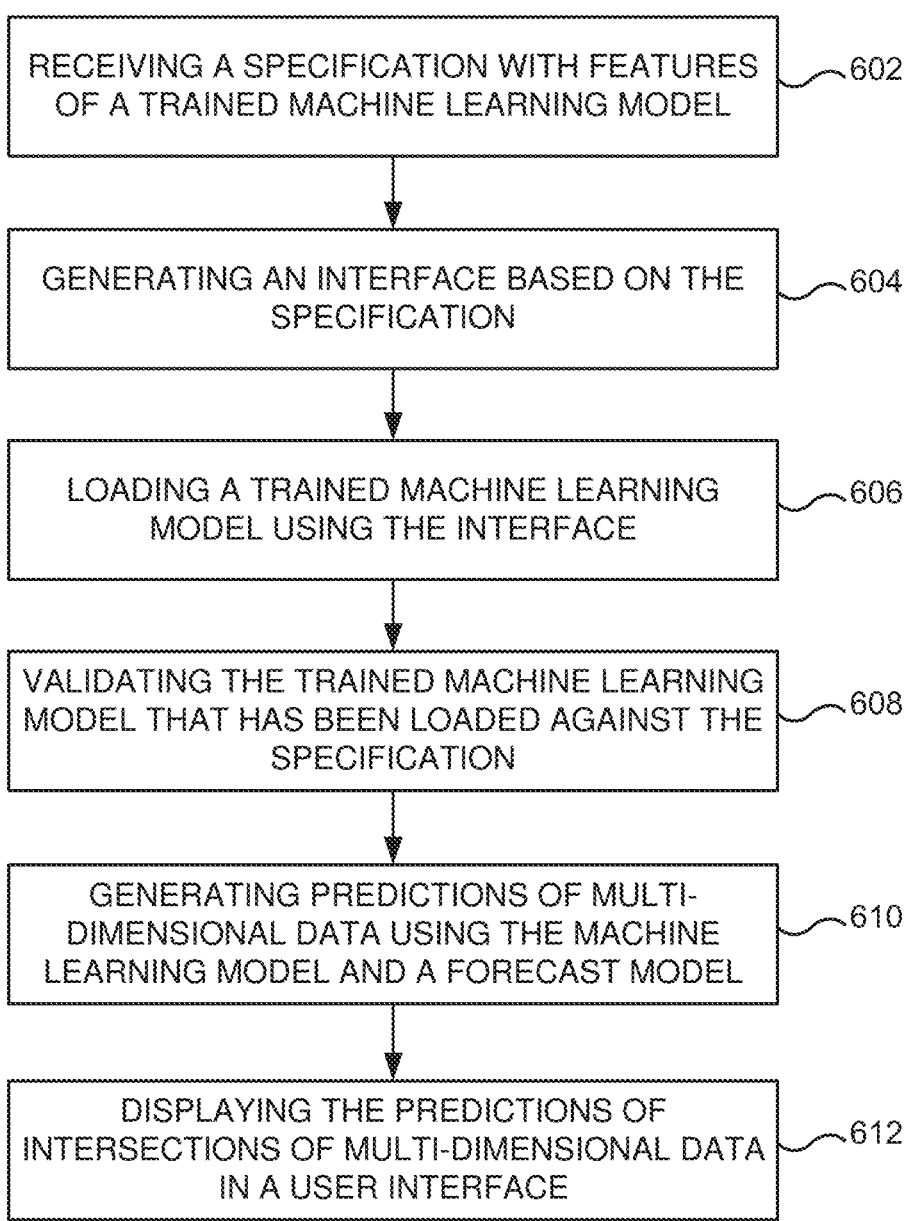

RECEIVING A SPECIFICATION WITH FEATURES OF A TRAINED MACHINE LEARNING MODEL   ~602

GENERATING AN INTERFACE BASED ON THE SPECIFICATION   ~604

LOADING A TRAINED MACHINE LEARNING MODEL USING THE INTERFACE   ~606

VALIDATING THE TRAINED MACHINE LEARNING MODEL THAT HAS BEEN LOADED AGAINST THE SPECIFICATION   ~608

GENERATING PREDICTIONS OF MULTI-DIMENSIONAL DATA USING THE MACHINE LEARNING MODEL AND A FORECAST MODEL   ~610

DISPLAYING THE PREDICTIONS OF INTERSECTIONS OF MULTI-DIMENSIONAL DATA IN A USER INTERFACE   ~612

Fig. 6

TUNING AND TRAINING A MACHINE LEARNING MODEL USING A FRAMEWORK ~702

DEFINING A SPECIFICATION FOR THE MACHINE LEARNING MODEL ~704

UPLOADING THE TRAINED MACHINE LEARNING MODEL USING AN INTERFACE ~706

RECEIVING PREDICTIONS OF INTERSECTIONS OF MULTIDIMENSIONAL DATA BASED IN PART ON THE MACHINE LEARNING MODEL ~708

EXTENSIBLE SOFTWARE TOOL WITH CUSTOMIZABLE MACHINE PREDICTION

FIELD

The embodiments of the present disclosure generally relate to an extensible software tool with customizable machine prediction.

BACKGROUND

Data planning, analytics, and processing for entities and/or scenarios have generated tangible benefits for organizations. For example, enhancements in planning and forecasting can lead to improved supply and/or logistic efficiencies and can result in better use of resources. Achieving such data planning, analytics, and processing can be challenging, particularly when entities include a large number of different departments and sub-departments with numerous dependencies among them. Such circumstances call for sophisticated data storage and modeling, retrieval, analytics, and display techniques to achieve the desired planning and forecasting results. In addition, planning, forecasting, and/or data prediction can be achieved through the use of a variety of different algorithms or predictions models, adding additional complexity to the software system as a whole. Systems that efficiently and effectively implement a variety of prediction models within such a sophisticated software system can provide improved flexibility while maintaining a robust planning and forecasting solution.

SUMMARY

The embodiments of the present disclosure are generally directed to systems and methods for performing customizable machine prediction using an extensible software tool that substantially improve upon the related art.

A specification including at least features of a trained machine learning model can be received. An interface for the trained machine learning model can be generated based on the received specification. The trained machine learning model can be loaded using the generated interface, the trained machine learning model including a binary file configured to receive data as input and generate prediction data as output. Predictions can be generated using observed data that is stored according to a multidimensional data model, wherein a portion of the observed data is input to the trained machine learning model that has been loaded to generate first data predictions, and a portion of the observed data is used by a generic forecast model to generate second data predictions. The first data predictions and the second data predictions can be displayed in a user interface configured to display intersections of the multidimensional data model.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 5 illustrates a user interface for displaying customizable machine predictions for intersections of multidimensional data in a graphical user interface according to an example embodiment.

FIG. 6 illustrates a flow diagram for performing customizable machine prediction using an extensible software tool according to an example embodiment.

DETAILED DESCRIPTION

Figure 1:
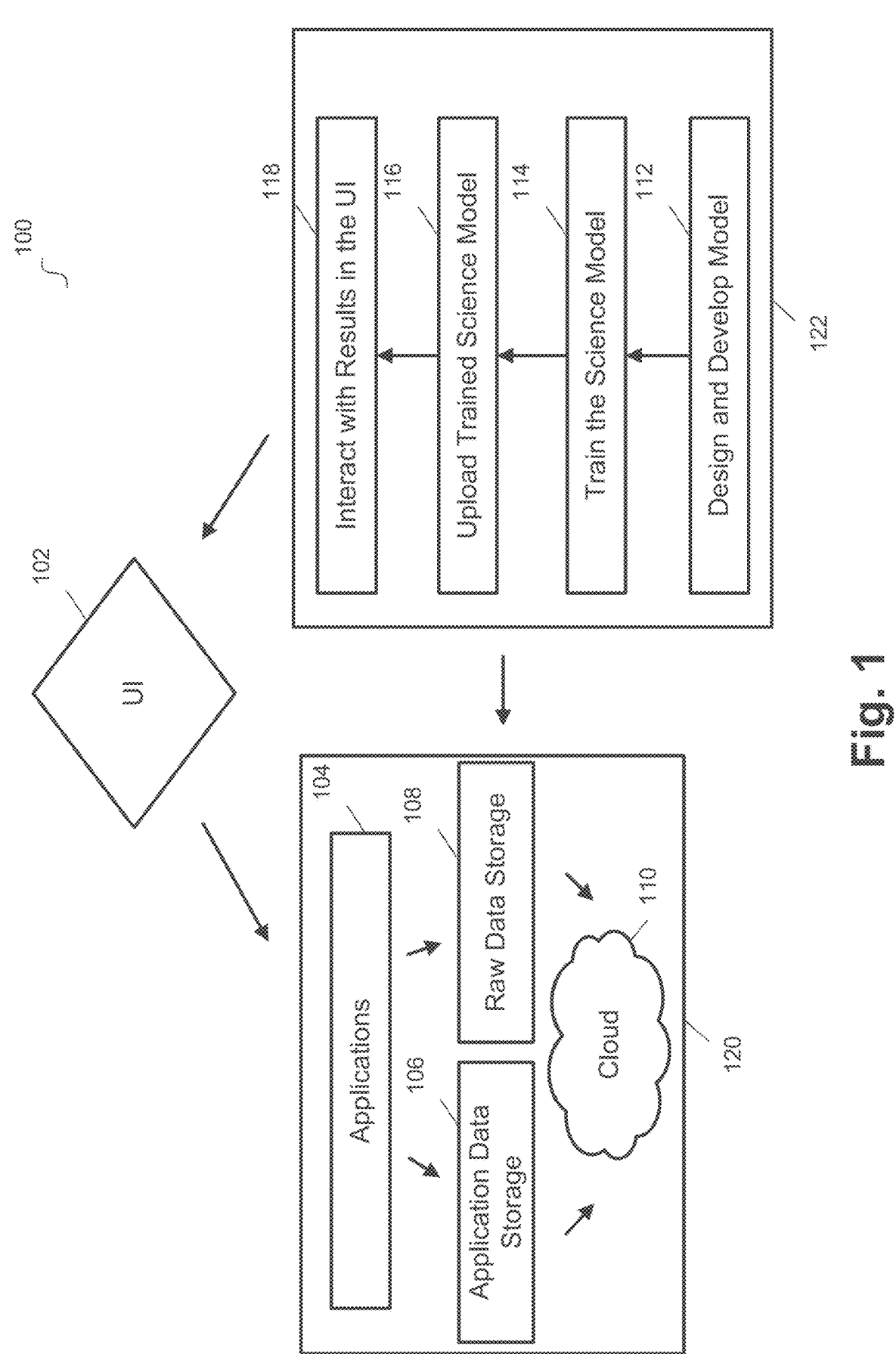
FIG. 1 illustrates a system for performing customizable machine prediction using an extensible software tool according to an example embodiment.

Embodiments perform customizable machine prediction using an extensible software tool. In some embodiments, a prediction model, such as a trained machine learning model, can be uploaded to a software tool in order to perform customizable machine prediction. For example, a software tool can perform data prediction or forecasting using built-in prediction models, such as linear regression. Embodiments provide an interface for loading a customizable trained model, such as neural network models, support vector machine models, specialized regression models (e.g., Deming regression, ridge regression, Lasso regression, and the like), random forest models, and the like, that can be used to perform customizable data predictions.

In some embodiments, a software tool (e.g., planning software and/or inventory system software) can perform data analytics on data stored according to a multidimensional data model. For example, the multidimensional data model can include multiple dimensions of data (e.g., organized in a hierarchy), where a data element can be representative of intersections of a plurality of the multiple dimensions. Based on the stored data, for example data generated based on observations over a period of time and stored, machine predictions can be performed for future data. In an example, the stored data can be sales data for a given product over a period of time, and the machine predictions can be demand forecasts for the product over a future period of time.

In some embodiments, the machine predictions can be achieved using built-in models with the software tool, such as linear regression, or using loaded prediction models from an external source, such as an external client. For example, the loaded prediction models can include models of a variety of types (e.g., neural networks, support vector machines, specialized regression, and the like), and can be trained using any data available to the external source. In some embodiments, the external source may have access to confidential data that can be used to train a prediction model that is not available to the software tool.

For example, the external source may be a retail entity that sells a product, and the retail entity may store confidential data about the product, sales, or other sensitive information that is not made available to others. In this example, the software tool does not have access to this confidential data, and thus any prediction model built-in to the software tool cannot be trained using this confidential data. On the other hand, embodiments provide for a prediction model that can be trained using this confidential data (in addition to other data) and loaded into the software tool. In these embodiments, the software tool will gain the functionality to perform data predictions based on machine learned insights or trends from the confidential data without exposing the confidential data to any other entity.

In some embodiments, shipments can be performed according to the machine predictions. For example, the machine predictions can be demand forecasts for one or more products in some embodiments, and, based on the forecasts, shipments can be executed between a warehouse and a store. When data predictions are performed by predictions models trained with the confidential data, the predictions may more accurately reflect real-world scenarios, and thus supply shipments can be executed in a manner that improves resource utilization.

Embodiments provide a number of improvements over traditional approaches. For example, traditionally, retailers use an in-house built system or an off the shelf commercial solution (e.g., from a software vendor) to produce data predictions, such as demand forecasts. For the former case, retailers may not have specialized resources to develop sophisticated systems or technical specialty to develop a robust software tool. For the latter case, the commercial solutions may be too generic to fit each retailer's unique circumstances, especially if advanced algorithms and/or models are at issue.

Some software vendors allow for a degree of customization, however this is normally limited in scope, in particular with respect to algorithms/modeling that can be used within a tool. For example, customizations are more prevalent in the usability and/or workflow functions of a software tool. Even if a software vendor were to allow analytical customizations, retailers would be required to share their algorithms/ classified data in order for the vendor to implement the customization. In many circumstances, retailers demand confidentiality for their proprietary algorithms and classified data, and thus are unwilling to share this information with software vendors. Accordingly, conventional approaches fall short of providing a customizable solution that also maintains confidentiality.

Embodiments perform customizable machine prediction using an extensible software tool by providing an interface for prediction models (e.g., previously trained machine learning models) that can be loaded into the software framework of a sophisticated software tool. For example, embodiments can display a variety of data predictions, where a first portion of the predictions use built-in predictions models to generate a forecast and a second portion of the predictions use the loaded model that has been customized to generate a forecast. In some embodiments, the software tool generates predictions based on various cross-sections of stored data within a multidimensional data model. These embodiments achieve a high level of customization based on the uploaded prediction model alongside the complex data storage, analytics, and processing of a sophisticated software tool.

Advantages of embodiments include a limitless customization of advanced algorithms/models that can be used to generate forecasts. In addition, for software vendors, algorithms/models that cover most or normal use cases (e.g., 60%, 70%, 80%, 90%, and the like), can be implemented within a software tool without using excessive resources on niche use cases for particular entities. Further, entities that require confidentiality can refrain from exposing any algorithm or confidential information when incorporating customizations. Lastly, entities can update the customized models continuously or at a regular period with efficiency due to the generated custom interface for the generated models.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for performing customizable machine prediction using an extensible software tool according to an example embodiment. System 100 includes user interface 102, applications 104, applications data storage 106, raw data storage 108, cloud server 110, software service 120, and external client 122. In some embodiments, user interface 102 can include a plurality of user interfaces for interacting with one or more applications (e.g., cloud applications) and/or software services.

For example, applications 104 can include cloud applications, locally stored applications, web applications, applets, and the like. For example, applications 102 can include components of Oracle® Retail Demand Forecasting ("RDF"), Oracle® Retail Predictive Application Server ("RPAS"), and other suitable frameworks/services (and user interface 102 can include user interfaces for Oracle® RDF, Oracle® RPAS, and the like). For example, applications 104 can provide planning and forecasting software services for an entity (e.g., retail entity). In some embodiments, data specific to applications 104 can be stored in application data storage 106 while raw data can be stored in raw data storage 108. For example, application data storage 106 can include an organization scheme (e.g., can be a database, such as an Oracle® database) while raw data storage 108 can store unstructured (or less structured) data.

In some embodiments, applications 104, application data storage 106, and/or raw data storage 108 can be implemented in a cloud architecture based on cloud server 110. In some embodiments, applications 104, application data storage 106, raw data storage 108, and cloud server 110 can be part of software service 120 (e.g., software as a service, platform as a service, architecture as a service, and the like).

Embodiments provide customizable predictions models that can be loaded into software services to provide enhanced functionality. In some embodiments, external client 122 can be external to (e.g., separate from) software service 120, where external client 122 can load a customizable prediction model into software service 120. For example, applications 104 and/or application data storage 106 can be loaded with a customizable prediction model. Functions 112, 114, 116, and 118 can be performed in order to design, train, and load a customizable prediction model, and interact with the resultant predictions.

For example, at 112 a prediction model can be designed and developed. The design of the prediction model can include any suitable machine learning model components (e.g., a neural network, support vector state machine, specialized regression model, such as Deming regression, ridge regression, or Lasso regression, random forest model, and the like). At 114, the prediction model can be trained, for example using training data (e.g., confidential and non-confidential data). In some embodiments, 112 and 114 can be combined, rearranged, and/or iterated over such that the prediction model can be tuned and a specification that defines the prediction model can be generated.

At 116 the trained model can be uploaded, for example to software service 120. Once uploaded, applications 104 can use the uploaded prediction model to perform customized data predictions or forecasts and the data predictions can be displayed, for example using user interfaces 102. At 118 the results of the loaded prediction model can be interacted with by external client 122.

Figure 2:
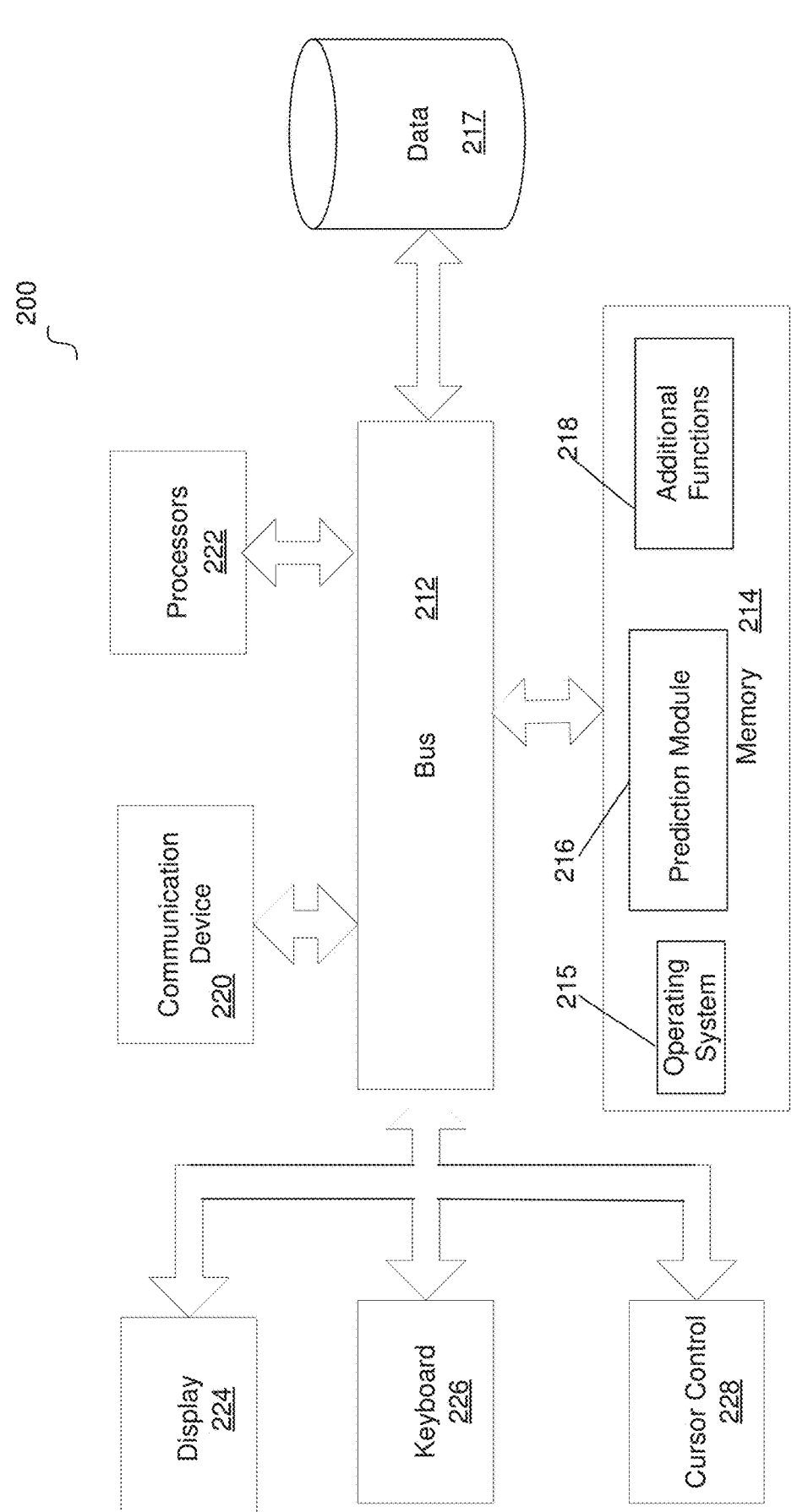
FIG. 2 illustrates a block diagram of a computing device operatively coupled to a system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, prediction module 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, prediction module 216 configured to perform enterprise planning and forecasting functionality, as well as other applications modules 218. Operating system 215 provides operating system functionality for system 200. In some instances, prediction module 216 may be implemented as an in-memory configuration. In some implementations, when system 200 executes the functionality of prediction module 216, it implements a nonconventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium. Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218 may include various modules of Oracle® Cloud Infrastructure, Oracle® Cloud Platform, Oracle® Cloud Applications, for example. Prediction module 216, other applications module 218, and any other suitable component of system 200 can include various modules of Oracle® Retail Demand Forecasting ("RDF"), Oracle® Retail Predictive Application Server ("RPAS"), and other suitable frameworks/services.

A database 217 is coupled to bus 212 to provide centralized storage for modules 216 and 218 and to store, for example, data received from prediction module 216 or other data sources. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, etc.). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component. Further, when implemented to execute functionality disclosed herein, system 200 is a special purpose computer, specially adapted to provide demand forecasting.

Referring back to FIG. 1, in some embodiments, applications 104 can provide enterprise planning and forecasting functionality. For example, a multi-dimensional data model can be implemented to provide a robust, flexible, and efficient framework for generating one or more plans and/or forecasts for an entity (e.g., retail entity). A multi-dimensional data model can be represented by a cube, where each side of the cube represents different dimensions of data (e.g., measures, product, plan, period, channel, and the like). An example measures dimension can include measures members of an enterprise or a retail entity, such as revenue, profit, expenses, inventory, sales, and the like, where each can further include child measures members (e.g., child members). An example plan dimension can include plan members that represent various plans for the enterprise or retail entity, such as working plan, previous plan, current plan, future plan, and the like. An example channel dimension can include members that represent channels for performing part of a customer transaction, such as in-store, direct to consumer, third party, and the like.

Figure 3A:
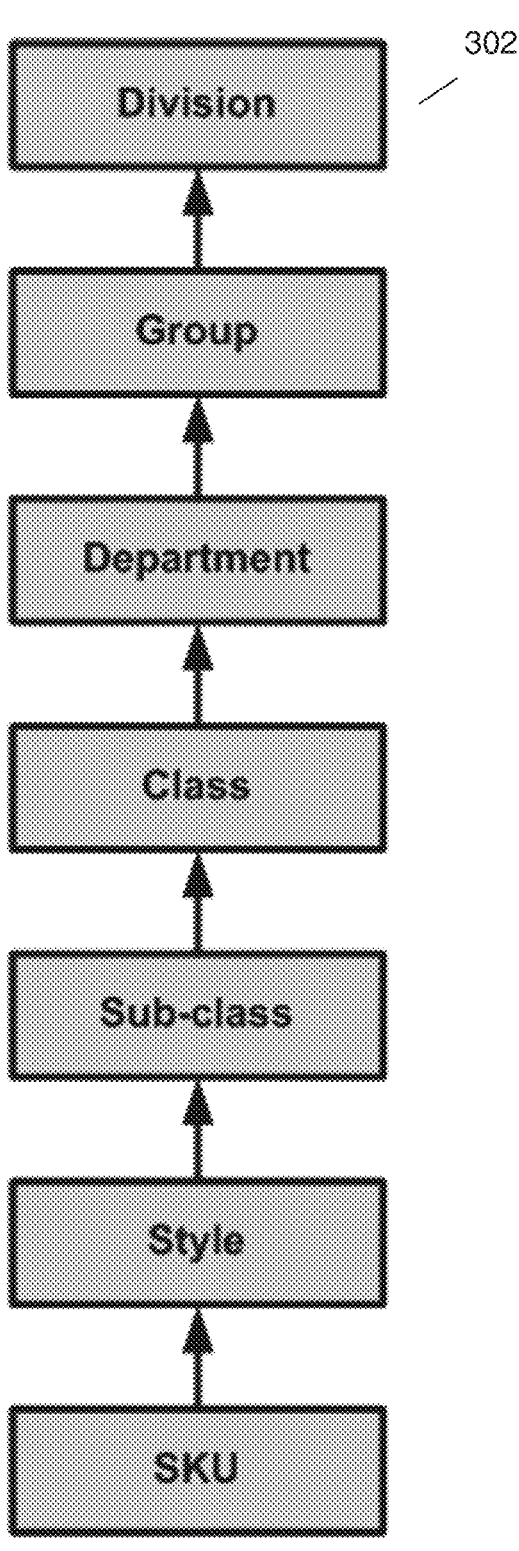
FIGS. 3A-3B illustrate a hierarchical dimension of a multi-dimensional data model according to an example embodiment.

Some embodiments include a hierarchical multi-dimensional data model, where members of a dimension further have child members. For example, a product member of the product dimension can include child members, such as a product line that features a variety of products within the product line. In this example, the product line member can be considered a parent member and the variety product members within the product line can be considered child members of the parent member. In some embodiments, the member hierarchy can include a number of levels, such a three (e.g., grandparent, parent, child), four, or many more. FIG. 3A illustrates a hierarchical dimension of a multi-dimensional data model according to an example embodiment. Dimension 302 illustrates an example product dimension with hierarchical levels division, group, department, class, sub-class, style and stock keeping unit ("SKU") number.

In some embodiments, cross-sections of data can be retrieved as part of the generating and/or displaying of enterprise or retail planning and forecasting data. For example, selections can be received for cross-sections of the multi-dimensional data that involve the display of various combinations or intersections of data. An example cross-section of data can include a combination of a given plan (e.g., specific members of the plan dimension), product (e.g., specific members of the product dimension), and measures (e.g., specific members of the measures dimension).

In some embodiments, an intersection represents a specific combination of dimensions/members of data. For example, inventory data for a specific sweater within a specific product line can be represented by an intersection of the inventory member of the measure dimension and the specific sweater member (e.g., under the specific product line member of the product dimension). Workbooks and/or worksheets, as further described herein, can display data elements that represent specific intersections of data. In some embodiments, a cross-section of data includes a plurality of intersections of data defined by the specific dimensions/members participating in the cross-section.

In some embodiments, a user of the planning and forecasting software can accomplish multiple planning and forecasting tasks using workbooks/worksheets. In an example, a workbook can be a user-defined data subset (e.g., from a database storing the enterprise or retail data), or one or more cross-sections of data that includes selected dimensions (e.g., dimensions and/or specific dimension members). A workbook can be viewed as a local copy of the data of record in the domain that a user can easily view and manipulate. Its multidimensional framework can be used to perform specific functions, such as generating sales forecasts and building merchandise financial plans. To present data, a workbook can contain multidimensional worksheets as well as graphical charts and related reports. For example, these workbooks can include views and graphical charts used for planning, viewing, and analyzing enterprise or retail data, including predicted data or forecast data.

An embodiment can include an example structure with the following elements: product levels and members such as a department, class, and sub-class for the men's sweater department; period levels and members such as half, month, and week for the Spring 2019 season; channel levels and members that may reflect multiple channels within an organization at their aggregate level, such as total in-store divisions, catalog, or e-Commerce (e.g., direct to consumer); plan versions such as Working Plan, Original Plan, Current Plan, and Last Year; measures and corresponding business rules such as sales, receipts, inventory, and the like. In some embodiments, workbooks can be built automatically, through a batch process, or manually using a software wizard. Once a workbook framework and its specific attributes have been defined and built, the structure can be saved as a workbook template, which allows new sets of data to be imported, manipulated, and presented as needed in a standardized format. Data in a workbook can be viewed at a detailed level or at an aggregate level.

In some embodiments, worksheets can be multidimensional, extensible, and dynamic spreadsheets that provide users with views of the data contained in a workbook. Oracle® RPAS and/or RDF can include built-in worksheets that support an industry standard business process. Rotating, pivoting, and format functions allow a user to create individual views within a worksheet. Data can be viewed at a very high level of detail, or data values can be quickly aggregated and viewed at summary levels. A user can display the information in a worksheet in a variety of formats, for example by rotating, changing the data rollup, showing and hiding measures, drilling up or down, and the like. The user interfaces illustrated in FIGS. 4 and 5 can be worksheets, graphs, or charts that are part of an example workbook.

In some embodiments, users may edit data at many levels of each dimension/member hierarchy (product, location, calendar). If the data is modified at an aggregate level (a level with one or more lower levels beneath it), the modifications can be distributed to the lower levels within the hierarchy, a process known as spreading. If data is modified at a level that has a higher level above it (parent), the data changes can be reflected in those higher levels, a process known as aggregating. Measures can be assigned a default aggregation and spreading behavior. A measure's aggregation method can determine how data is calculated at aggregate levels of the hierarchy, such as month or department. A measure's spread method can determine how data is spread to lower levels of a hierarchy when the user enters data at an aggregate level.

Figure 3B:
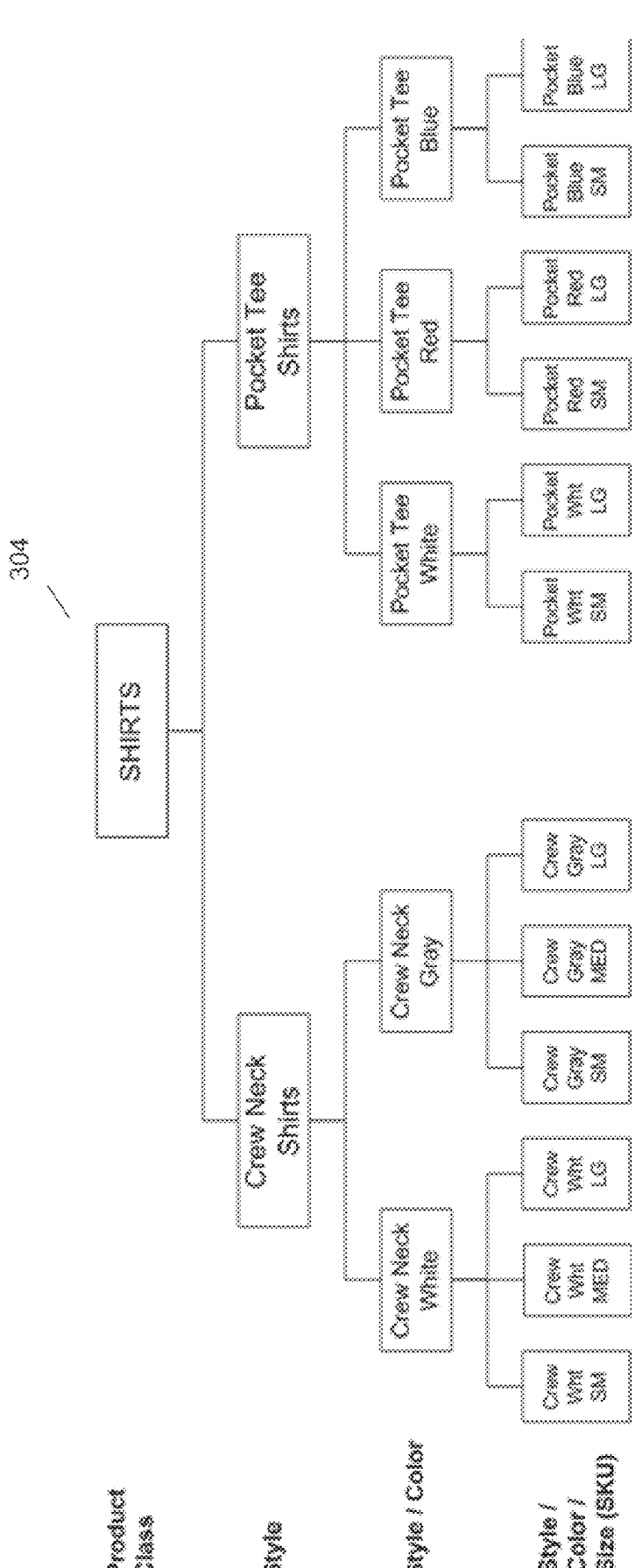

FIG. 3B illustrates a hierarchical dimension of a multi-dimensional data model according to an example embodiment. Hierarchy 304 illustrates an example product dimension with hierarchical levels product class, style, color, and SKU. In an example, if sales data for hierarchy 304 were to appear in the form of a planning worksheet, quantities could be viewed at the lowest level in the hierarchy (style/color/size, or SKU level). They can also be viewed at any higher level in the hierarchy.

Consider a scenario where there are exactly five of each SKU item in this hierarchy sold over a given period. When the SKU level items are aggregated to the style/color level, 15 white crew-neck shirts would be displayed as sold (5 small+5 medium+5 large). Further aggregation would show that a total of 30 crew-neck shirts were sold (15 white crew-necks+15 gray crew-necks). If this paradigm is extended to the product class level, aggregation would show that 60 shirts were sold (30 crew-necks+30 pocket tees).

Data can be aggregated along many possible hierarchical paths. For example, SKUs can roll up into styles, product lines, product classes, and ultimately product divisions. These same SKUs can also roll up along different hierarchical paths into vendors that provide the products or into the level products that are sold on commission. Any of these different aggregation paths can be defined in various embodiments.

Spreading (the opposite of aggregation) allows a user to view data at more detailed levels. In spreading, totals at higher level dimensions are allocated to lower level dimensions, which are based on the lower level's relationship to the total. In some examples, the data at the lowest level in the hierarchy may be too sparse to create a meaningful forecast, however, this same data can be useful in determining the percent contribution that each position in the lower level makes toward a higher level. For example, an aggregate-level class/store forecast can predict 50 shirts to be sold in Store #001 over a given time period. A forecast at the lower SKU/store level can determine that red shirts make up 40% of the demand, blue shirts make up 30%, white shirts make up 20%, and black shirts make up 10%. These percentages can be used to spread the total of 50 shirts back down to the lower level of color. In another example, an aggregate-level class/store forecast can predict 50 shirts to be sold in Store #001 over a given period of time. A forecast at the lower SKU/store level can also determine that red shirts make up 40% of the demand, blue shirts 30%, white shirts 20%, and black shirts 10%. These percentages can also be used to spread the total of 50 shirts back down to the lower level of color. In some examples, forecasts are run at low levels in a hierarchy to determine the percentages to be used when spreading forecast data from higher levels. Forecast data at low levels might be enough to generate reliable percentage-to-whole information, but, in some instances, forecast numbers are more robust when generated at the aggregate level.

Embodiments can leverage the planning software functionality and a multidimensional data model to accomplish forecasting. For example, Oracle RDF is a statistical forecasting solution that uses modeling techniques to produce forecasts. As noted herein, forecast information is often useful for items at a lowest level in a hierarchy (e.g., product hierarchy). Problems can arise when historic sales data for these items is sparse and/or noisy, and thus selling patterns for these items may be challenging to identify. In such cases, after a forecast is generated at a higher level, the resulting data can be allocated (spread) back down to the lower level, as described herein.

In a multidimensional data model, forecast data can be predicted for a particular intersection of data (e.g., cross-section of multiple dimensions of the data). Example parameters for a data forecast can be as follows:

Intersection—the hierarchy dimensions that define the forecasting level;

Source Data—the Source Data is the measure to be used as the input data for the generation of forecasts;

Periodicity—Periodicity is the number of periods within the Calendar dimension, which are defined in the forecast level intersection. For example, if an intersection is defined at Week/item/store, the Periodicity value will be 52 (since there are 52 weeks within a year);

Forecast Method—the forecast generation methods (or models) that may be defined for a forecast level;

Plan Data—the details of the anticipated shape and scale of an item's selling pattern, which can be used by a forecast method;

Seasonal Profile—the anticipated seasonality of an item's selling pattern, which can be generated or loaded, and can also be used by the forecast method. The value in this parameter is a measure name. The intersection of the seasonal profile measure can be the same as the intersection of the forecast level.

Spreading Profile—used to spread source level forecasts down to the final forecast level.

In some embodiments, the Forecast Method can implement one or more prediction models. Example built-in forecast methods can include Average, Moving Average, Intermittent, Trend, Additive Seasonal, Multiplicative Season, and others. In some embodiments, built-in forecast methods can implement one or more built-in predictions models, such as linear regression or ridge regression. An example model, or demand model, for these includes: $Y \approx \beta P_0 + \beta_1 X_1 + \beta_2 X_2 + \ldots + \beta_p X_p$, where "Y" represents the prediction (e.g., demand prediction) and $\beta$ represents the coefficient estimates for different demand variables/features $(X_1, X_2, \ldots X_p)$, for example that impact demand, such as price discount, brand, promotions, size, color, pack size, supplier, and the like.

In some embodiments, this list of built-in forecast methods can be extensible, and an external source (e.g., external client) can add one or more additional forecast methods based on a loaded prediction model (e.g., trained machine learning model). For example, referring back to FIG. 1, external client 122 can include a network device, such as a computer, that can upload a prediction model to software service 120 (which can include the planning and forecasting software tool). In some embodiments, external client 122 can be a retail entity that uses software service 120 for planning and forecasting. However, external client 122 can have an external prediction model, trained external to software service 120, for use with the service's planning and forecasting tool. This prediction model can be loaded into software service 120 using an interface generated by the service.

In some embodiments, the prediction model generation, loading, and interactions can follow the functionality of 112, 114, 116, and 118 of FIG. 1. For example, at 112 a prediction model can be designed and developed. The design of the prediction model can include any suitable machine learning model components (e.g., a neural network, support vector machine, specialized regression model, such as Deming regression, ridge regression, or Lasso regression, random forest model, and the like). For example, a neural network can be implemented along with a given cost function (for training purposes). The neural network can include any number of hidden layers (e.g., 0, 1, 2, 3, or many more), and can include feed forward neural networks, recurrent neural networks, convolution neural networks, modular neural networks, and any other suitable type. In some embodiments, the neural network can be configured for deep learning, for example based on the number of hidden layers implemented. In some examples, a Bayesian network can be similarly implemented, or other types of supervised learning models.

In other examples, unsupervised learning models, such as a support vector machine, can be implemented, in some instances along with one or more kernels (e.g., gaussian kernel, linear kernel, and the like). In some embodiments, the designed prediction model can be multiple prediction models stacked, for example with the output of a first model feeding into the input of a second model. Some implementations can include a number of layers of predictions models. In some embodiments, features of the prediction model can also be determined. For example, feature engineering can be used to generate a set of features implemented by one or more prediction models.

At 114, the prediction model can be trained, for example using training data (e.g., confidential and non-confidential data). For example, external client 122 can be an entity (e.g., retail entity) that keeps some data confidential (e.g., does not desire to share this data with software service 120 which can be an unrelated third-party vendor in a cloud-based or Software as a Service ("SaaS") implementation). In some embodiments, this confidential data can include types of sales data, planned product selection, margin data (revenue–cost), credit card data, and the like. Other data may not be confidential, such as other types of sales data, past product selection, types of overhead (e.g., cost), and the like. The non-confidential data can be shared with software service 120 and some other entities.

In some embodiments, the prediction model can be trained with both confidential and non-confidential data. For example, because the prediction model is not trained by software service 120, confidential data is also available for training purposes. The training can include iterating over a data set and adjusting weights of the prediction model until a cost function is optimized (or until generated predictions are within a margin of error from a validation data set). Other types of prediction model training can also be implemented.

In some embodiments, the confidential data can be stored in data storage not depicted in FIG. 1. For example, external client 122 (e.g., external retail entity) can include a secure data store that stores the confidential data with access restrictions. In other words, the confidential data can also be considered data stored in a secure data store that cannot be accessed by applications 104 due to access restrictions.

In some embodiments, the design of the prediction model can be tuned during training. For example, tuning can include adjusting a number of hidden layers in a neural network, adjusting a kernel calculation used to implement a support vector machine, and the like. This tuning can also include adjusting/selecting features used by the prediction model. Embodiments include implementing various tuning configurations (e.g., different versions of the prediction model and features) while training in order to arrive at a configuration for the prediction model that, when trained, achieves desired performance (e.g., performs predictions at a desired level of accuracy).

In some embodiments, 112 and 114 can be combined, rearranged, and/or iterated over such that the prediction model can be tuned and a specification that defines the prediction model can be generated. For example, once a configuration for a prediction model is selected and the model is trained, a specification for the model can be generated. The specification can define the features used by the prediction model (e.g., inputs for the prediction model), as well as a size for the generated prediction model (e.g., size of the binary file), a framework for the prediction model (e.g., PyTorch, TensorFlow, and the like), a function or operator for the prediction model, and other suitable parameters for the prediction model. In some embodiments, a model (e.g., generated binary file) can include multiple operators or functions, such as an operator A that calculates the prediction and an operator B that calculates prediction errors. The operator name can be used to specify which operator performs the prediction. Further, in embodiments with validation, the specified operator can be validated, for instance by verifying its existence and its inputs and outputs.

In some embodiments, once the specification is generated it can be sent to software service 120. Based on the parameters for the prediction model defined in the specification, software service 120 can generate a custom interface (e.g., application programming interface ("API")) for the prediction model. The custom interface can be used to load the prediction model into software service 120 such that the prediction model can be used with the planning and forecasting software tool to extend the forecasting methods available in the tool.

In some embodiments, the custom interface is a special expression in RDF whose inputs can be parameters, such as path to the binary file (e.g., prediction model), measure names of features, and the like. For example, the features can include the data loaded into the multidimensional data model (e.g., intersections of the data). An example of API, or special express in RDF, is below: ML_OUTPUT:c_ml-baselinear,ML_OUTPUT_MSG:c_mlmsglinear<-RdfML-ForecastExpr(RUN_MASK:c_mlrunmask1,ML_CHKPT_PATH:c_mlpathlinear, ML_FEATURE1:c_mlfeature1,ML_FEATURE2:c_mlfeature2,ML_FEATURE3:c_mlfeature3, ML_FEATURE4:c_mlfeature4,ML_FEATURE5:c_mlfeature5,ML_FEATURE6:c_mlfeature6,ML_FEATURE7: c_mlfeature7,ML_FEATURE8:c_mlfeature8,ML_FEATURE9:c_mlfeature9,  ML_FEATURE10:c_mlfeature10, ML_OPERATOR:c_mlopsname,ML_INPUT_PLACE-HOLDER:c_mlinputname)

At 116 the trained model can be uploaded, for example to software service 120. In some embodiments, the trained model is uploaded using the custom interface generated for the model. Embodiments also include validation functions to validate that the trained model is compatible with the planning and forecasting software tool and the defined specification. For example, the validation functions can include one or more of: validating that the model is loadable, such as validating that the binary file uploaded can be loaded by the software tool for use when forecasting; validating that the number of features (e.g., defined in the specification and/or by the custom API) matches the loaded model; and validating that the calculation operator (e.g., defined in API and/or specification) matches the loaded model.

Once loaded and validated, applications 104 can use the uploaded prediction model to perform customized data predictions or forecasts and the data predictions can be displayed, for example using user interfaces 102. At 118 the results of the loaded prediction model can be interacted with by external client 122. For example, data predictions can be performed using the loaded prediction model and the stored multidimensional data. The loaded prediction model can receive input from the multidimensional data (e.g., as defined in the specification for the prediction model), and generate forecast data for a future period of time. In some embodiments, the forecast data can be presented in a workbook or one or more multidimensional worksheets. Accordingly, a user (e.g., a user associated with external client 122) can interact with the forecast data using the dynamic functionality of the workbook/multidimensional worksheets, as disclosed herein.

Figure 4:
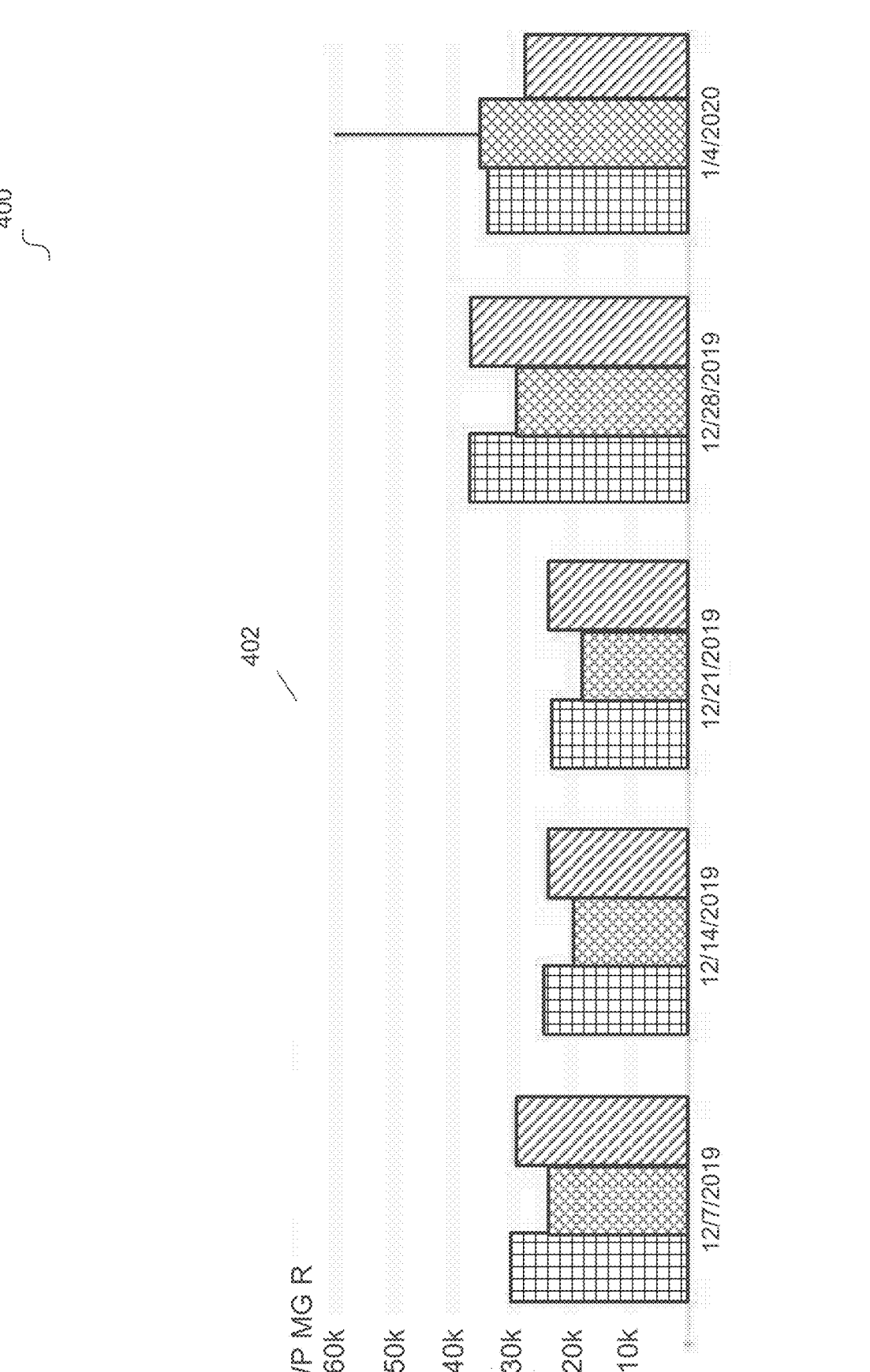
FIG. 4 illustrates a user interface for displaying customizable machine predictions using an extensible software tool in a graphical user interface according to an example embodiment.

FIG. 4 illustrates a user interface for displaying customizable machine predictions using an extensible software tool in a graphical user interface according to an example embodiment. User interface 402 displays a chart of an intersection of multidimensional data that can be forecasted using a loaded prediction model. For example, the forecast can be predicted data for an intersection of a product (or product line), a scenario (e.g., particular plan), a measure (e.g. forecasted revenue), and a period (e.g., future period of time). The forecast can be predicted based on observed data (or other predicted data, such as sales predictions over a similar period of time) that is input into the loaded prediction model (as defined in the specification), where the model can leverage its previous training (e.g., configured links and weights) to generate predicted data for the forecast. As illustrated, the chart can graph the forecasted data according to an interval (e.g., weekly, bi-weekly, monthly, quarterly, and the like).

FIG. 5 illustrates a user interface for displaying customizable machine predictions for intersections of multidimensional data in a graphical user interface according to an example embodiment. User interface 502 displays a multidimensional worksheet including multiple intersections of multidimensional data that can be forecasted using a loaded prediction model. Similar to FIG. 4, each intersection can be predicted data for an intersection of a product (or product line), a scenario (e.g., particular plan), a measure (e.g. forecasted revenue), and a period (e.g., future period of time).

In the illustrated embodiments, the multidimensional worksheet shows intersections that include a plurality of measures and plans. For example, intersections 504, 506, and 508 may include the same cross-section of multidimensional data (e.g., Location, Product, Period of time, and Plan) other than the measure dimension, where intersection 504 includes a sales measure, intersection 506 includes a net sales measure, and intersection 508 includes a markdown measure. Similarly, intersections 504 and 510 may include the same cross-section of multidimensional data (e.g., Location, Product, Period of time, Measure) other than the plan dimension, where intersection 504 includes a "Wp" plan while intersection 510 includes a "Cp" plan.

With reference to the intersections of user interface 502, a portion of the forecast can be predicted based on observed data (or other predicted data, such as sales predictions over a similar period of time) that is input into the loaded prediction model (as defined in the specification), where the model can leverage its previous training (e.g., configured links and weights) to generate predicted data for the forecast. In addition, a portion of the forecast can be predicted based on observed data (or other predicted data, such as sales predictions over a similar period of time) that is input into a built-in prediction model to generate predicted data. Accordingly, in some embodiments, a portion of the forecasts displayed in the worksheet can be predicted using a customizable and loaded prediction model while a portion of the forecasts displayed in the worksheet can be predicted using a build-in prediction model.

For example, the loaded prediction model can be used to forecast data for one or more of the plan scenarios, for a portion of measures, and the like, while a built-in prediction model can be used for other plans or measures. In other embodiments, the loaded prediction model can be used to forecast some products or product lines, while other products or product lines can be forecast using built-in prediction models. For example, a trained Bayesian network can provide insights from sparse training data that other prediction models may not be able to ascertain. As a result, some intersections of the multidimensional data may achieve improved results with a customized prediction model (e.g., a prediction model other than the built-in predictions models of the planning and forecasting tool). For example, some products (such as at the fine grain end of a product dimension hierarchy) can have only sparse data available for prediction, and forecasts of intersections with these products can benefit from a prediction model specifically configured for sparse data.

In some embodiments, aggregation behavior can also involve some data predicted using a built-in prediction model and other data predicted using the loaded prediction model. For example, a parent value, such as a predicted inventory of a product line, can be calculated based on an aggregation of the values predicted for multiple child values, such as the predicted inventories of multiple products under the product line. In an illustrative example, a first product under the product line may use one of the built-in prediction models to predict product demand while a second product under the product line may use the loaded prediction model to predict product demand. Aggregation can then be used to determine the predicted product demand for the product line, which can be a sum of the predicted demand for the first and second products. Accordingly, a predicted value for an intersection of data can include a component predicted using a built-in prediction model and a component predicted using the loaded prediction model.

Various circumstances may impact which prediction model is used for which product. In the above example, the second product may be a new product offering, and as a result, the built-in prediction models may not be well equipped to provide an accurate forecast. For example, the external client (e.g., retail entity) may keep confidential some data that can increase the accuracy of a demand forecast for the second product. Accordingly, a loaded prediction model that was previously trained with the confidential data can result in more accurate predictions and increased resource efficiency. Other circumstances can similarly benefit from such functionality.

In some embodiments, a previously loaded prediction model can be continually (or periodically) updated by external client 122. In such cases, an updated specification can be sent to software service 120, and the custom API can be updated based on any changes to the specification (e.g., feature changes, binary file changes, and the like). The adjusted prediction model (e.g., updated binary file) can then be uploaded using the updated API, and a subsequent validation can be performed, after which the updated prediction model can be made available to the planning and forecasting software tool.

FIG. 6 illustrates a flow diagram for performing customizable machine prediction using an extensible software tool according to an example embodiment. In one embodiment, the functionality of FIGS. 6 and 7 below is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIGS. 6 and 7 can be performed by one or more elements of system 200 of FIG. 2.

At 602, a specification comprising at least features of a trained machine learning model can be received. For example, a machine learning model can be developed and trained, and the specification can define the features used by the trained machine learning model (e.g., inputs for the prediction model), as well as a size for the generated prediction model (e.g., size of the binary file), a framework for the prediction model (e.g., PyTorch, TensorFlow, and the like), an operator for the prediction model, and other suitable parameters for the prediction model.

At 604, an interface for the trained machine learning model based on the received specification can be generated. For example, based on the parameters for the machine learning model defined in the specification, a custom interface (e.g., application programming interface ("API")) can be generated for the machine learning model.

Figure 7:
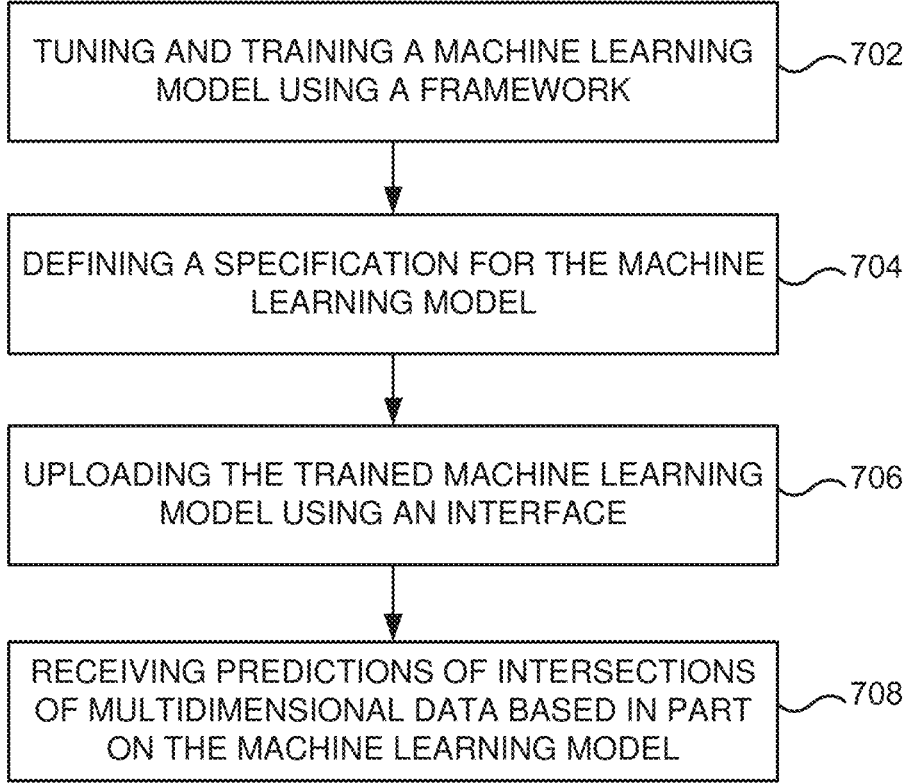
FIG. 7 illustrates a flow diagram for training and uploading a customizable machine learning module for use with an extensible software tool to perform machine prediction according to an example embodiment.

At 606, the trained machine learning model can be loaded using the generated interface. In some embodiments, the trained machine learning model can be a binary file configured to receive data as input and generate prediction data as output. FIG. 7 provides further disclosure about the trained machine learning model that can be loaded. In some embodiments, the generated custom interface can be used to load the machine learning model such that the machine learning model can be used to generate forecasts and data predictions.

At 608, the trained machine learning model that has been loaded can be validated against the received specification. For example, the validation functions can include one or more of: validating that the model is loadable, such as validating that the binary file uploaded can be loaded by a software tool for use when forecasting; validating that the number of features (e.g., defined in the specification and/or by the custom API) matches the loaded model; and validating that the calculation operator (e.g., defined in API and/or specification) matches the loaded model.

At 610, predictions can be generated using observed data that is stored according to a multi-dimensional data model. For example, multi-dimensional data (e.g., enterprise or retailed data) can be stored in a database, as disclosed herein. In some embodiments, the multi-dimensional data can be hierarchical, including a plurality of members in the product, measure, period, and/or plan dimensions, one or more of these dimensions including hierarchical members. Other dimensions and/or members (e.g., hierarchical members) can be implemented in various embodiments.

In some embodiments, a portion of the observed data can be input to the trained machine learning model that has been loaded to generate first data predictions, and a portion of the observed data can be used by a generic forecast model to generate second data predictions. For example, a generic forecast model can include built-in forecasting methods for a planning and forecasting data tool, and the trained machine learning model can be an extension of these built-in forecasting methods.

At 612, the first data predictions and the second data predictions can be displayed in a user interface configured to display intersections of the multi-dimensional data model. For example, the user interface can include one or more charts and graphs, a multidimensional workbook/worksheet, or a combination of these, as described herein.

FIG. 7 illustrates a flow diagram for training and uploading a customizable machine learning module for use with an extensible software tool to perform machine prediction according to an example embodiment. For example, the functionality of FIG. 6 can be implemented along with the functionality of FIG. 7.

At 702, a machine learning model can be tuned and trained using a framework. For example, the design of the machine learning model can include any suitable machine learning model components (e.g., a neural network, support vector state machine, specialized regression model, such as Deming regression, ridge regression, or Lasso regression, random forest model, and the like).

In some embodiments, the training can include iterating over a data set and adjusting weights of the machine learning model until a cost function is optimized (or until generated predictions are within a margin of error from a validation data set). Other types of machine learning model training can also be implemented. In some embodiments, the machine learning model can be trained with both confidential and non-confidential data. For example, because the prediction model is not trained by a third-party software service, confidential data is available for training purposes.

In some embodiments, the design of the machine learning model can be tuned during training. For example, tuning can include adjusting a number of hidden layers in a neural network, adjusting a kernel calculation used to implement a support vector machine, and the like. This tuning can also include adjusting/selecting features used by the machine learning model. Embodiments include implementing various tuning configurations (e.g., different versions of the prediction model and features) while training in order to arrive at a configuration for the machine learning model that, when trained, achieves desired performance (e.g., performs predictions at a desired level of accuracy).

At 704, a specification for the trained machine learning model can be defined. For example, once a configuration for the machine learning model is selected and the model is trained, a specification for the model can be generated. The specification can define the features used by the prediction model (e.g., inputs for the prediction model), as well as a size for the generated prediction model (e.g., size of the binary file), a framework for the prediction model (e.g., PyTorch, TensorFlow, and the like), an operator for the prediction model, and other suitable parameters for the prediction model At 706, the trained machine learning model can be uploaded using an interface. For example, a software service can generate a custom interface for the machine learning model based on the generated specification, as disclosed herein. The custom interface can be used to load the trained machine learning model.

At 708, predictions of intersections of multidimensional data can be received based in part on the uploaded machine learning model. For example, data predictions can be performed using the loaded machine learning model and the stored multidimensional data. The loaded machine learning model can receive input from the multidimensional data (e.g., as defined in the specification for the model), and generate forecast data for a future period of time. In some embodiments, the forecast data can be presented in a workbook or one or more multidimensional worksheets. Accordingly, a user can interact with the forecast data using the dynamic functionality of the workbook/multidimensional worksheets, as disclosed herein.

Embodiments can improve conventional approaches to forecasting solutions by providing enterprises (e.g., retailers) a mechanism to use custom algorithms/models to improve forecast accuracy of a demand forecast. In many situations, the demand forecast is a driver of the supply chain, and, if it is inaccurate, allocation, planning and replenishment perform poorly, resulting in inefficient resource usage. In general, if the forecast is high, items will remain unsold; they either need to be sold at a discount, or wastage increases. If the forecast is low, demand is not satisfied and retailers experience lost sales and low client satisfaction. Both cases result in inefficient resource usage. Embodiments provide techniques for achieving a reliable demand forecast and thus improve the efficiency of resource utilization in the supply chain and across the enterprise.

Figure 8:
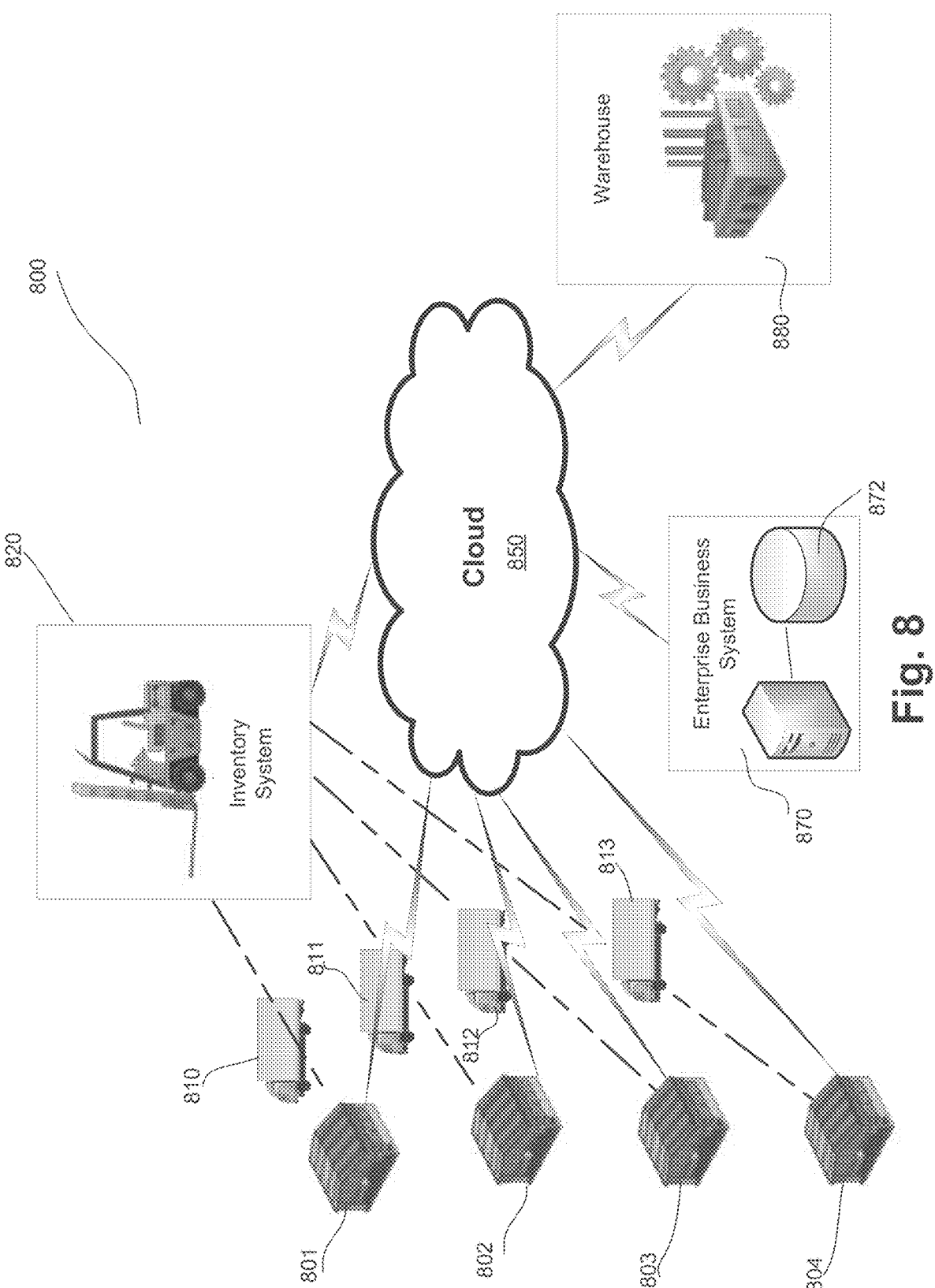
FIG. 8 illustrates an integrated supplier, inventory, and logistics system that includes improved planning and supply actions as disclosed herein according to an example embodiment.

FIG. 8 illustrates an integrated supplier, inventory, and logistics system that includes stock management as disclosed herein according to an example embodiment. As shown in FIG. 8, system 800 can include an enterprise business system 870 that executes code to manage stock of products for enterprise locations 801-804 using warehouse 880, and to ship products from warehouse 880 directly to consumers. Enterprise business system 870 is in communication through a cloud network 850 or other type of communications network with one or more inventory system 820. In some embodiments, planning and forecasting software of enterprise business system 870 can generate a forecast that provides forecasted inventory levels for a variety of products. Inventory system 820 and warehouse 880 can execute shipments to and from enterprise locations 801-804 based on these forecasted inventory levels. In some embodiments, the use of a customized and trained prediction model can provide improvements to these forecasted inventory levels, thus generating a more efficient shipment process.

Inventory system 820 stores inventory and provides transportation logistics to deliver items to enterprise locations 801-804 and to consumer locations (e.g., consumer homes) using trucks 810-813 or some other transportation mechanisms. Inventory system 820 in one embodiment implements an Enterprise Resource Planning ("ERP") specialized computer system or a specialized inventory control system that uses input from enterprise business system 810, such as an in-season plan generated by planning and forecasting software, to determine levels of inventories and the amount and timing of the delivery of products to enterprise locations 801-804.

Warehouse 880 can be a fulfillment warehouse that supplies one or more products to enterprise locations 801-804 based on inventory system 820 and that ships products to consumer locations (e.g., consumer homes). Warehouse 880 in one embodiment implements an ERP specialized computer system or a specialized supplier system that uses input from enterprise business system 810, such as an in-season plan generated by planning and forecasting software, to determine an amount of and timing for product shipments to inventory system 820 and/or enterprise locations 801-804. In some embodiments, for instance based on returns to enterprise locations 801-804, warehouse 880 may receive shipments form enterprise locations, for instance to ensure the enterprise locations are not oversupplied and have sufficient product variety.

Embodiments perform customizable machine prediction using an extensible software tool. In some embodiments, a prediction model, such as a trained machine learning model, can be uploaded to a software tool in order to perform customizable machine prediction. For example, a software tool can perform data prediction or forecasting, using built-in prediction models, such as linear regression. Embodiments provide an interface for loading a customizable trained model, such as neural network models, support vector state machine models, specialized regression models (e.g., Deming regression, ridge regression, Lasso regression, and the like), random forest models, and the like, that can be used to perform customizable data predictions.

In some embodiments, a software tool (e.g., planning software and/or inventory system software) can perform data analytics on data stored according to a multidimensional data model. For example, the multidimensional data model can include multiple dimensions of data (e.g., organized in a hierarchy), where a data element can be representative of intersections of a plurality of the multiple dimensions. Based on the stored data, for example data generated based on observations over a period of time and stored, machine predictions can be performed for future data. In an example, the stored data can be sales data for a given product over a period of time, and the machine predictions can be demand forecasts for the product over a future period of time.

In some embodiments, the machine predictions can be achieved using built-in models with the software tool, such as linear regression, or using loaded prediction models from an external source, such as an external client. For example, the loaded prediction models can include models of a variety of types (e.g., neural networks, support vector machines, specialized regression, and the like), and can be trained using any data available to the external source. In some embodiments, the external source may have access to confidential data that can be used to train a prediction model that is not available to the software tool.

For example, the external source may be a retail entity that sells a product, and the retail entity may store confidential data about the product, sales, or other sensitive information that is not made available to others. In this example, the software tool does not have access to this confidential data, and thus any prediction model built-in to the software tool cannot be trained using this confidential data. On the other hand, embodiments provide for a prediction model that can be trained using this confidential data (in addition to other data) and loaded into the software tool. In these embodiments, the software tool will gain the functionality to perform data predictions based on machine learned insights or trends from the confidential data without exposing the confidential data to any other entity.

In some embodiments, shipments can be performed according to the machine predictions. For example, the machine predictions can be demand forecasts for one or more products in some embodiments, and, based on the forecasts, shipments can be executed between a warehouse and a store. When data predictions are performed by predictions models trained with the confidential data, the predictions may more accurately reflect real-world scenarios, and thus supply shipments can be executed in a manner that improves resource utilization.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for performing customizable machine prediction using an extensible software tool, the method comprising:

receiving a specification comprising at least features of a trained machine learning model including a set of input features used to generate predictions;

generating an interface for the trained machine learning model based on the received specification, wherein the interface comprises one or more definitions that correspond to the set of input features;

loading the trained machine learning model using the generated interface, the trained machine learning model comprising a binary file configured to receive data as input and generate prediction data as output, wherein the loading includes validating that the binary file is configured to receive input that matches the set of input features;

generating, by the software tool, predictions using observed data that is stored according to a hierarchical multidimensional data model by:

inputting a) a portion of the observed data that matches the set of input features to the binary file to generate first data predictions, and b) a portion of the observed data to a forecast model to generate second data predictions, wherein, the trained machine learning model is trained using confidential data that is not accessible by the software tool and that is not used to train or configure the forecast model, the multidimensional data model comprises at least a measure dimension, product dimension, and one or more additional dimensions, and the first data predictions correspond to a first member of the measure dimension and the second data predictions correspond to a second member of the measure dimension, the first member and the second member of the measure dimension comprising different measures related to product demand;

retrieving, by a software component configured via plan data, intersections of the hierarchical multidimensional data model, wherein the plan data defines that c) first of the retrieved intersections include the first data predictions and a first product or product line from the product dimension, and d) second of the retrieved intersections include the second data predictions and a second product or product line from the product dimension;

displaying, in a user interface, e) the first retrieved intersections and the second retrieved intersections, and f) an aggregation data value that corresponds to another intersection of the hierarchical multidimensional data model, wherein the aggregation data value comprises an aggregation of one or more of the first data predictions and one or more of the second data predictions;

generating an updated interface based on an updated specification that defines an other set of input features different from the set of input features;

loading, using the updated interface, an other version of the trained machine learning model comprising an other binary file, wherein the other version of the trained machine learning model is a retrained version of the trained machine learning model, and the loading includes validating that the other binary file is configured to receive input that matches the other set of input features; and generating, by the software tool, additional predictions by inputting, to the other binary file, an other portion of the observed data that matches the other set of input features.

2. The method of claim 1, wherein the generated interface comprises an application programming interface (API) configured to load the trained machine learning model according to the received specification.

3. The method of claim 2, wherein the forecast model comprises a linear regression model and the trained machine learning model that has been loaded comprises a trained neural network or a trained support vector machine.

4. The method of claim 2, wherein the trained machine learning model is trained using the observed data that is stored according to the hierarchical multidimensional data model and the confidential data, wherein the confidential data is stored according to the hierarchical multidimensional data model.

5. The method of claim 1, further comprising:

causing a quantity of the one or more retail items to be shipped to a retail location based on the first data predictions and second data predictions.

6. The method of claim 1, wherein, the one or more additional dimensions comprise a scenario dimension, the plan data defines that the first retrieved intersections include a first member of the scenario dimension and the second retrieved intersections include a second member of the scenario dimension.

7. The method of claim 1, wherein the another intersection of the hierarchical multidimensional data model includes a parent product line that is a parent of the first product or product line and the second product or product line with respect to the product dimension of the hierarchical multidimensional data model, and the aggregation data value represents a demand prediction for the a parent product line.

8. The method of claim 1, wherein the set of input features corresponds to a set of members of the measure dimension of the hierarchical multidimensional data model, and the other set of input features corresponds to a different set of members of the measure dimension of the hierarchical multidimensional data model.

9. The method of claim 1, wherein the set of input features is adjusted to the other set of input features during training of the retrained version of the trained machine learning model.

10. The method of claim 1, wherein the loading of the trained machine learning model comprises validating that the binary file matches a file size defined in the specification, and the loading of the other version of the trained machine learning model comprises validating that the other binary file matches a file size defined in the updated specification.

11. The method of claim 1, wherein the specification defines a first operator for the trained machine learning model and the first data predictions are generated via the binary file and the first operator, and the updated specification defines a second operator for the other version of the trained machine learning model and the additional data predictions are generated via the other binary file and the second operator.

12. A non-transitory computer readable medium having instructions stored thereon that, when executed by a processor, cause the processor to perform customizable machine prediction using an extensible software tool, wherein, when executed, the instructions cause the processor to:

receive a specification comprising at least features of a trained machine learning model including a set of input features used to generate predictions;

generate an interface for the trained machine learning model based on the received specification, wherein the interface comprises one or more definitions that correspond to the set of input features;

load the trained machine learning model using the generated interface, the trained machine learning model comprising a binary file configured to receive data as input and generate prediction data as output, wherein the loading includes validating that the binary file is configured to receive input that matches the set of input features;

generate, by the software tool, predictions using observed data that is stored according to a hierarchical multidimensional data model by:

inputting a) a portion of the observed data that matches the set of input features to the binary file to generate first data predictions, and b) a portion of the observed data to a forecast model to generate second data predictions, wherein, the trained machine learning model is trained using confidential data that is not accessible by the software tool and that is not used to train or configure the forecast model, the multidimensional data model comprises at least a measure dimension, product dimension, and one or more additional dimensions, and the first data predictions correspond to a first member of the measure dimension and the second data predictions correspond to a second member of the measure dimension, the first member and the second member of the measure dimension comprising different measures related to product demand;

retrieve, by a software component configured via plan data, intersections of the hierarchical multidimensional data model, wherein the plan data defines that c) first of the retrieved intersections include the first data predictions and a first product or product line from the product dimension, and d) second of the retrieved intersections include the second data predictions and a second product or product line from the product dimension;

display, in a user interface, e) the first retrieved intersections and the second retrieved intersections, and f) an aggregation data value that corresponds to another intersection of the hierarchical multidimensional data model, wherein the aggregation data value comprises an aggregation of one or more of the first data predictions and one or more of the second data predictions;

generate an updated interface based on an updated specification that defines an other set of input features different from the set of input features;

load, using the updated interface, an other version of the trained machine learning model comprising an other binary file, wherein the other version of the trained machine learning model is a retrained version of the trained machine learning model, and the loading includes validating that the other binary file is configured to receive input that matches the other set of input features; and generate, by the software tool, additional predictions by inputting, to the other binary file, an other portion of the observed data that matches the other set of input features.

13. The non-transitory computer readable medium of claim 12, further comprising:

causing a quantity of the one or more retail items to be shipped to a retail location based on the first data predictions and second data predictions.

14. The non-transitory computer readable medium of claim 12, wherein the generated interface comprises an application programming interface (API) configured to load the trained machine learning model according to the received specification.

15. The non-transitory computer readable medium of claim 14, wherein the trained machine learning model is trained using the observed data that is stored according to the hierarchical multidimensional data model and the confidential data, wherein the confidential data is stored according to the hierarchical multidimensional data model.

16. A system for performing customizable machine prediction using an extensible software tool, the system comprising:

a processor; and a memory storing instructions for execution by the processor, the instructions configuring the processor to:

receive a specification comprising at least features of a trained machine learning model including a set of input features used to generate predictions;

generate an interface for the trained machine learning model based on the received specification, wherein the interface comprises one or more definitions that correspond to the set of input features;

load the trained machine learning model using the generated interface, the trained machine learning model comprising a binary file configured to receive data as input and generate prediction data as output, wherein the loading includes validating that the binary file is configured to receive input that matches the set of input features;

generate, by the software tool, predictions using observed data that is stored according to a hierarchical multidimensional data model by:

inputting a) a portion of the observed data that matches the set of input features to the binary file to generate first data predictions, and b) a portion of the observed data to a forecast model to generate second data predictions, wherein, the trained machine learning model is trained using confidential data that is not accessible by the software tool and that is not used to train or configure the forecast model, the multidimensional data model comprises at least a measure dimension, product dimension, and one or more additional dimensions, and the first data predictions correspond to a first member of the measure dimension and the second data predictions correspond to a second member of the measure dimension, the first member and the second member of the measure dimension comprising different measures related to product demand;

retrieve, by a software component configured via plan data, intersections of the hierarchical multidimensional data model, wherein the plan data defines that c) first of the retrieved intersections include the first data predictions and a first product or product line from the product dimension, and d) second of the retrieved intersections include the second data predictions and a second product or product line from the product dimension;

display, in a user interface, e) the first retrieved intersec-
tions and the second retrieved intersections, and f) an
aggregation data value that corresponds to another
intersection of the hierarchical multidimensional data
model, wherein the aggregation data value comprises
an aggregation of one or more of the first data predic-
tions and one or more of the second data predictions;

generate an updated interface based on an updated speci-
fication that defines an other set of input features
different from the set of input features;

load, using the updated interface, an other version of the
trained machine learning model comprising an other
binary file, wherein the other version of the trained
machine learning model is a retrained version of the
trained machine learning model, and the loading
includes validating that the other binary file is config-
ured to receive input that matches the other set of input
features; and generate, by the software tool, additional predictions by
inputting, to the other binary file, an other portion of the
observed data that matches the other set of input
features.

17. The system of claim 16, wherein the generated inter-
face comprises an application programming interface (API)
configured to load the trained machine learning model
according to the received specification.

18. The system of claim 17, wherein the trained machine
learning model is trained using the observed data that is
stored according to the hierarchical multidimensional data
model and confidential data that is not accessible by the
software tool and that is not used to train or configure the
forecast model.

19. The method of claim 18, wherein first training data,
including the confidential data, used to train the first
machine learning model comprises a sparse amount of
observed data with respect to the first product or product
line, and second training data use to train or configure the
forecast model comprises an amount of observed data with
respect to the second product or product line that is not
sparse.

* * * * *